(12) United States Patent
Hiroe

(10) Patent No.: US 11,205,812 B2
(45) Date of Patent: Dec. 21, 2021

(54) COOLING SYSTEM FOR ON-BOARD BATTERY

(71) Applicant: TOYOTA JIDOSHA KABUSHIKI KAISHA, Toyota (JP)

(72) Inventor: Yoshihiko Hiroe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 16/672,566

(22) Filed: Nov. 4, 2019

(65) Prior Publication Data

US 2020/0185800 A1 Jun. 11, 2020

(30) Foreign Application Priority Data

Dec. 5, 2018 (JP) .............................. JP2018-228203

(51) Int. Cl.
| | | |
|---|---|---|
| *H01M 10/6569* | (2014.01) | |
| *H01M 10/613* | (2014.01) | |
| *H01M 10/63* | (2014.01) | |
| *H01M 10/625* | (2014.01) | |
| *B60L 58/26* | (2019.01) | |
| *B60K 1/00* | (2006.01) | |

(52) U.S. Cl.
CPC ..... *H01M 10/6569* (2015.04); *H01M 10/613* (2015.04); *H01M 10/625* (2015.04); *H01M 10/63* (2015.04); *B60K 1/00* (2013.01); *B60K 2001/005* (2013.01); *B60L 58/26* (2019.02)

(58) Field of Classification Search
CPC .... B60K 11/02; B60K 1/00; B60K 2001/005; B60L 1/003; B60L 1/02; B60L 2240/14; B60L 2240/545; B60L 2240/642; B60L 2260/44; B60L 3/0046; B60L 50/64; B60L 58/26; H01M 10/425; H01M 10/482; H01M 10/486; H01M 10/613; H01M 10/625; H01M 10/63; H01M 10/6569; H01M 2010/4271; H01M 2220/20; H01M 50/20

See application file for complete search history.

(56) References Cited

U.S. PATENT DOCUMENTS

| 2008/0110189 A1* | 5/2008 | Alston | ............... B60H 1/00428 62/236 |
|---|---|---|---|
| 2019/0077275 A1* | 3/2019 | Capati | ..................... B60L 58/26 |

FOREIGN PATENT DOCUMENTS

JP 2015-230797 A 12/2015

* cited by examiner

*Primary Examiner* — Adam A Arciero
(74) *Attorney, Agent, or Firm* — Sughrue Mion, PLLC

(57) ABSTRACT

It is determined whether or not the absolute value |a_sd| of the acceleration in the stacking direction of the cells is equal to or greater than the threshold THa (step S10). If the determination result of the step S10 is positive, it is determined whether or not the condition in which the absolute value |a_sd| is equal to or greater than the threshold THa continues (step S12). If the determination result of the step S12 is positive, the control valve is closed (step S14).

8 Claims, 14 Drawing Sheets

COOLING SYSTEM FOR ON-BOARD BATTERY

CROSS-REFERENCE TO RELATED APPLICATION

The present application claims priority under 35 U.S.C. § 119 to Japanese Patent Application No. 2018-228203, filed Dec. 5, 2018. The contents of this application are incorporated herein by reference in their entirety.

BACKGROUND

The present disclosure relates to a system for cooling a battery mounted on a vehicle.

JP2015-230797A discloses a cooling system for a battery mounted on a vehicle. The conventional cooling system includes a heat exchanger, a switching device and a controller. The switching device switches between a heat exchangeable state in which cooling water is circulated between a battery and the heat exchanger and a heat retaining state in which the cooling water around the battery is removed. The controller controls the switching device based on temperature of the battery and that of outside air.

Consider a cooling system in which the battery is cooled by evaporation heat of a coolant. The evaporation heat is the heat that the coolant takes from the surroundings when the coolant of the fluid becomes gaseous. In this cooling system, a liquid-phase coolant is supplied around the battery. If the temperature around the battery is higher than evaporating temperature of the coolant, the liquid-phase coolant changes to gas-phase coolant thereby the battery is cooled.

In this cooling system, a boundary between the gas-phase and the liquid-phase is formed around the battery. However, this boundary is susceptible to acceleration and deceleration of the vehicle and also susceptible to inclination in a road (i.e., upward and downward slopes). For this reason, part of the battery may not be sufficiently cooled depending on traveling state of the vehicle. In particular, if the battery is composed of a stack of cells, a variation in temperature may occur between the cells.

One object of the present disclosure is to provide a technique capable of suppressing an occurrence of the variation in temperature between the cells included in the battery of the cooling system in which the battery is cooled by the evaporation heat of the coolant.

The first aspect is a cooling system for on-board battery.

The cooling system includes a battery, a circuit, a first heat exchanger, a second heat exchanger, a control valve, an acquiring device and a controller.

The battery is mounted on a vehicle.

In the circuit, a coolant circulates to change between liquid-phase and gas-phase by exchanging heat with the battery.

The first heat exchanger is provided in midstream of the circuit. The first heat exchanger is configured to change the coolant from the gas-phase to the liquid-phase.

The second heat exchanger is provided downstream of the first heat exchanger. The second heat exchanger is configured to exchange heat with the battery using liquid-phase coolant flowing from the first heat exchanger.

The control valve is provided between the first and second heat exchangers. The control valve is configured to control flow volume of the liquid-phase coolant flowing from the first heat exchanger into the second heat exchanger.

The acquiring device is configured to acquire a parameter having a correlation with force acting on the vehicle.

The controller is configured to adjust an opening degree of the control valve.

The battery includes a stack of cells.

The second heat exchanger includes a common pipe for the cells that extends in a direction parallel to a stacking direction of the cells and is commonly provided in the cell.

The controller is further configured to:

estimate, based on the parameter, magnitude of the force acting in the stacking direction on the liquid-phase coolant flowing through the common pipe for the cells; and if the magnitude of the force acting in the stacking direction is greater than or equal to a first preset value, adjust the opening degree to reduce the flow volume.

The second aspect further has the following features in the first aspect.

The controller is further configured to:

determine whether or not a first state in which the magnitude of the force acting in the stacking direction is equal to or greater than the first preset value continues over a first determination period; and if it is determined that the first state continues over the first determination period, adjust the opening degree to reduce the flow volume.

The third aspect further has the following feature in the second aspect.

The controller is further configured to adjust the opening degree so that the flow volume is null if it is determined that the first state continues over the first determination period.

The fourth aspect further has the following features in the first aspect.

The cooling system further includes multiple temperature sensors. Each of the multiple temperature sensors is configured to detect each temperature of at least two cells included in the battery.

The controller is further configured to:

calculate, based on the temperatures of the at least two cells, a first variation in temperature between the at least two cells;

determine whether or not the first variation in temperature is greater than or equal to a first determination value; and if it is determined that the first variation in temperature is equal to or greater than the first determination value, adjust the opening degree to increase the flow volume.

The fifth aspect further has the following features in the first aspect.

The battery is composed of multiple batteries provided in parallel.

The circuit includes a common pipe for the multiple batteries that extends in an array direction of the multiple batteries and is commonly provided in the multiple batteries.

The controller is further configured to:

estimate, based on the parameter, the magnitude of the force acting in the array direction on the liquid-phase coolant flowing through the common pipe for the multiple batteries; and if the magnitude of the force acting in the array direction is greater than or equal to a second preset value, adjust the opening degree to reduce the flow volume.

The sixth aspect further has the following features in the fifth aspect.

The controller is further configured to:

determine whether or not a second state in which the magnitude of the force acting in the array direction is equal to or greater than the second preset value continues over a second determination period; and if it is determined that the second state continues over the second determination period, adjust the opening degree to reduce the flow volume.

The seventh aspect further has the following feature in the sixth aspect.

The controller is further configured to adjust the opening degree so that the flow volume is null if it determined that second state continues over the second determination period.

The eighth aspect further has the following features in the fifth aspect:

The cooling system further includes multiple temperature sensors. Each of the multiple temperature sensors is configured to detect each temperature of the multiple batteries.

The controller is further configured to:

calculate, based on the each temperature, a second variation in temperature between the multiple batteries;

determine whether or not the second variation in temperature is greater than or equal to a second determination value; and if it is determined that the second variation in temperature is equal to or greater than the second determination value, adjust the opening degree to increase the flow volume.

According to the first aspect, when the magnitude of the force acting in the stacking direction on the cells is equal to or greater than the first preset value, the opening degree of the control valve is adjusted so that the flow volume of the liquid-phase coolant flowing from the first heat exchanger into the second heat exchanger is reduced. The fact that the magnitude of the force acting in the stacking direction is greater than or equal to the first preset value means that the boundary is affected by the traveling state. In such a case, if the opening degree of the control valve is adjusted so as to reduce the flow volume of the liquid-phase coolant, it is possible to prevent the variation in temperature between the cells from occurring.

According to the second aspect, if it is determined that the first state continues over the first determination period, the opening degree of the control valve is adjusted to reduce the flow volume of the liquid-phase coolant flowing from the first heat exchanger into the second heat exchanger. The first state is a state in which the magnitude of the force acting in the stacking direction is greater than or equal to the first preset value. Therefore, the fact that the first state continues over the first determination period means that the boundary is greatly affected by the traveling state. In such a case, if the opening degree of the control valve is adjusted so as to reduce the flow volume of the liquid-phase coolant, it is possible to prevent the variation in temperature between the cells from occurring.

According to the third aspect, if it is determined that the first state continues over the first determination period, the opening degree of the control valve is adjusted so that the flow volume of the liquid-phase coolant is null. Therefore, it is possible to satisfactorily prevent the variation in temperature between the cells from occurring.

According to the fourth aspect, if it is determined that the first variation in temperature is equal to or greater than the first determination value, the opening degree of the control valve is adjusted so as to increase the flow volume of the liquid-phase coolant. The first variation in temperature is a variation in temperature between the at least two cells in the stacking direction. The fact that the first variation in temperature is greater than or equal to first determination value means that the variation in temperature has occurred between the cells despite adjusting the opening degree of the control valve based on any one of the first to third aspects. In such a case, if the opening degree of the control valve is adjusted so as to increase the flow volume of the liquid-phase coolant, it is possible to reduce the variation in temperature that is currently occurring.

According to the fifth aspect, if the magnitude of the force acting in the array direction on the multiple batteries is greater than or equal to the second preset value, the opening degree of the control valve is adjusted so that the flow volume of the liquid-phase coolant flowing from the first heat exchanger into the second heat exchanger is reduced. The fact that the magnitude of the force acting in the array direction is greater than or equal to the second preset value means that the boundary is affected by the traveling state. In such a case, if the opening degree of the control valve is adjusted so as to reduce the flow volume of the liquid-phase coolant, it is possible to prevent the variation in temperature between the multiple batteries from occurring.

According to the sixth aspect, if it is determined that the second state continues over second determination period, the opening degree of the control valve is adjusted to reduce the flow volume of the liquid-phase coolant. The second state is a state in which the magnitude of the force acting in the array direction is greater than or equal to the second preset value. Therefore, the fact that the second state continues over the second determination period means that the boundary is greatly affected by the traveling state. In such a case, if the opening degree of the control valve is adjusted so as to reduce the flow volume of the liquid-phase coolant, it is possible to prevent the variation in temperature between the multiple batteries from occurring.

According to the seventh aspect, if it is determined that the second state continues over the second determination period, the opening degree of the control valve is adjusted so that the flow volume of the liquid-phase coolant is null. Therefore, it is possible to satisfactorily prevent the variation in temperature between the multiple batteries from occurring.

According to the eighth aspect, if it is determined that the second variation in temperature is equal to or greater than the second determination value, the opening degree of the control valve is adjusted so as to increase the flow volume of the liquid-phase coolant. The second variation in temperature is a variation in temperature between the multiple batteries. The fact that the second variation in temperature greater than or equal to the second determination value means that the variation in temperature has occurred between the batteries despite adjusting the opening degree of the control valve based on the fifth aspect. In such a case, if the opening degree of the control valve is adjusted so as to increase the flow volume of the liquid-phase coolant, it is possible to reduce the variation in temperature that is currently occurring.

Hereinafter, embodiments of the present disclosure will be described with reference to drawings. It should be noted that same signs are attached to the same elements in the respective drawings, and duplicate descriptions are omitted.

1. FIRST EMBODIMENT

First, a first embodiment of the present disclosure will be described with reference to FIG. 1 to FIG. 11.

1.1 Configuration of Cooling System

The cooling system according to the first embodiment is a system for cooling a battery mounted on a vehicle (i.e., an on-board battery). Examples of the vehicle include an electronic vehicle and a plug-in hybrid vehicle. The battery is cooled using evaporation heat of a coolant. The coolant has a property of evaporating at an operating temperature region of the battery.

(i) First Configuration Example

Figure 1:
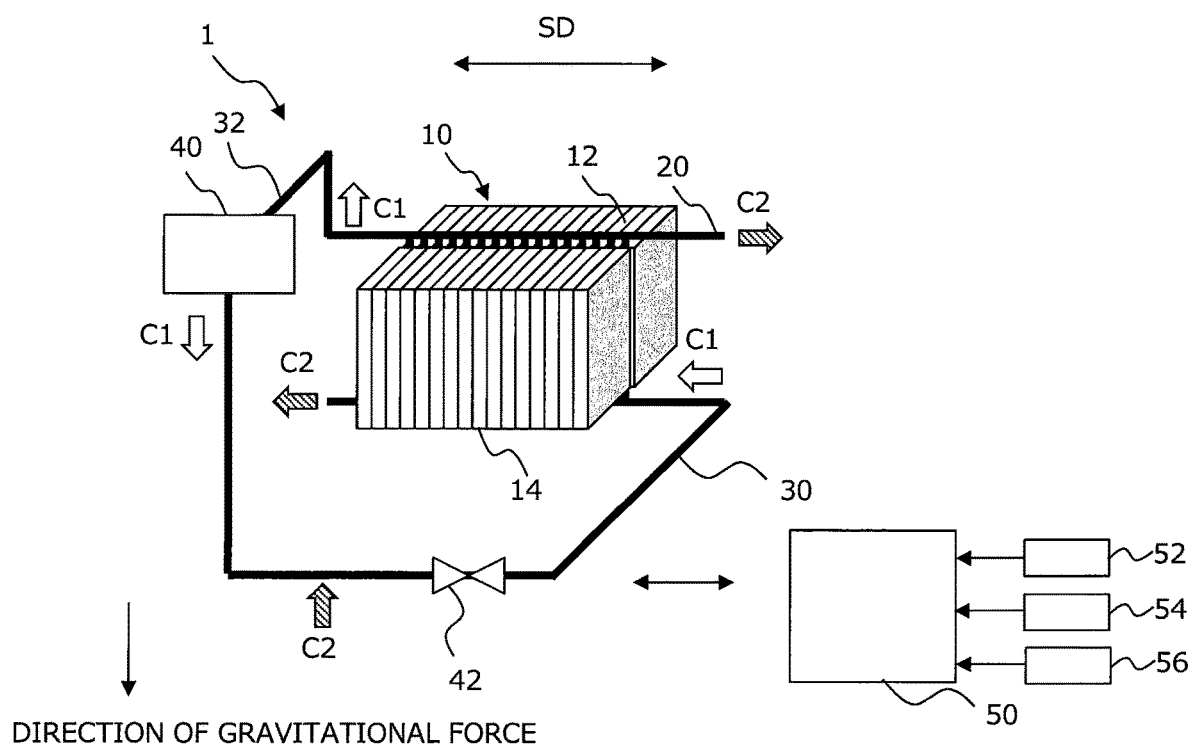
FIG. 1 is a diagram for illustrating a first configuration example of a cooling system according to a first embodiment.

FIG. 1 is a diagram for illustrating a first configuration example of the cooling system according to the first embodiment. A cooling system 1 shown in FIG. 1 includes a battery 10, a heat exchange portion 20, coolant pipes 30 and 32, a chiller 40, a control valve 42 and a controller 50.

The battery 10 supplies power to a motor for traveling via an inverter (not shown). The battery 10 stores regenerative power. The battery 10 has a first stack 12 and a second stack 14. Each of the first stack 12 and the second stack 14 has a plurality of cells. The first stack 12 and the second stack 14 are arranged in a direction perpendicular to a stacking direction SD of the cells.

The heat exchange portion 20 is provided between the first stack 12 and the second stack 14. The heat exchange portion 20 has two pipes stretching parallel to the stacking direction SD. One end of a pipe (i.e., a first pipe) which is located below in a direction of gravitational force is connected to a coolant pipe 30. One end of a pipe (i.e., a second pipe) which is located over in the direction of the gravitational force is connected to a coolant pipe 32. The detailed configuration of the heat exchange portion 20 including these pipes will be described later.

The coolant pipes 30 and 32 constitute a circuit of the coolant. The coolant in liquid-phase (liquid-phase coolant) flows through the coolant pipe 30. On the other hand, the coolant in gas-phase (gas-phase coolant) flows through the coolant pipe 32. The heat exchange portion 20 and the chiller 40 are provided at a connecting point between the coolant pipes 30 and 32.

The chiller 40 is a heat exchanger for heat-exchanging the coolant in gas-phase flowing from the coolant pipe 32 with outside air or cooling water. The coolant in liquid-phase is discharged from the chiller 40. The coolant in liquid-phase discharged from the chiller 40 flows into the coolant pipe 30. A control valve 42 is provided downstream of the chiller 40 in the coolant pipe 30. The control valve 42 regulates flow volume of the coolant in liquid-phase flowing through the coolant pipe 30. Examples of the control valve 42 include a normally closed electromagnetic valve.

The controller 50 is a microcomputer including a CPU (Central Control Unit), a memory, input/output ports, and the like. An inertial sensor 52, an inclination sensor 54 and a current sensor 56 are connected to the input port of the controller 50. The inertial sensor 52 detects acceleration of the vehicle in a longitudinal direction and a horizontal direction. The inclination sensor 54 detects an inclination of the vehicle. The current sensor 56 detects charging current and discharging current of the battery 10. The control valve 42 is connected to the output port of the controller 50.

The controller 50 determines a state of the battery 10 based on values detected by the current sensor 56. When the controller 50 determines that the battery 10 is in the discharging or charging state, it executes valve control in which the control valve 42 is opened.

Arrows C1 and C2 represent flow directions of the coolant in the cooling system 1. Each of the arrows C1 represents the flow direction of the coolant in normal time. Each of the arrows C2 represents the flow direction in which the coolant in liquid-phase returns to the coolant pipe 30. As shown in the arrows C2, the coolant in liquid-phase coolant returns between the chiller 40 and the control valve 42. By providing such a return path, the coolant which has not vaporized during flowing through the heat exchange portion 20 is prevented from flowing into the chiller 40 through the coolant pipe 32. In a midstream of this return path, a reservoir tank may be provided to store excess coolant in liquid-phase.

(ii) Second Configuration Example

Figure 2:
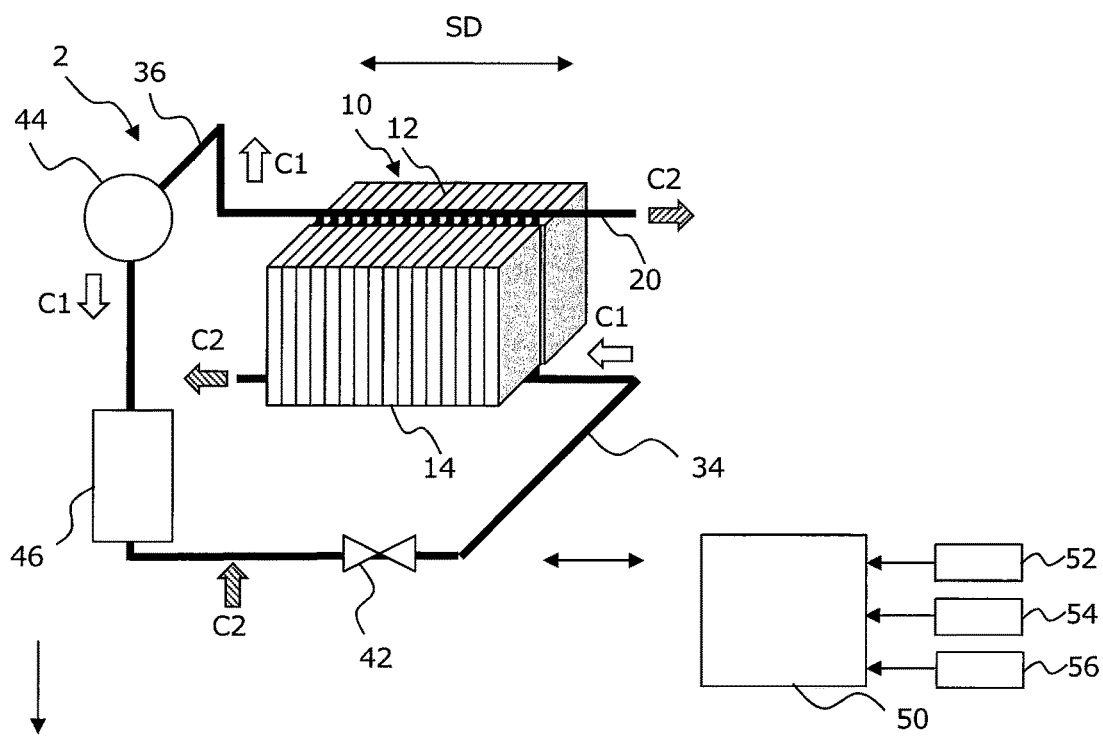
FIG. 2 is a diagram for illustrating a second configuration example of the cooling system according to the first embodiment.

FIG. 2 is a diagram for illustrating a second configuration example of the cooling system according to the first embodiment. A cooling system 2 shown in FIG. 2 includes the battery 10, the heat exchange portion 20, coolant pipes 34 and 36, the control valve 42, a compressor 44, a condenser 46, and the controller 50.

The coolant pipes 34 and 36 constitute the circuit of the coolant. The coolant in liquid-phase flows through the coolant pipe 34. On the other hand, the coolant in gas-phase flows through the coolant pipe 36. The heat exchange portion 20, the compressor 44 and the condenser 46 are provided at a connecting point between the coolant pipe 34 and the 36.

Like the chiller 40 shown in FIG. 1, the compressor 44 and condenser 46 work totality as a heat exchanger. In other words, the compressor 44 compresses the coolant in gas-phase. The condenser 46 cools the coolant in gas-liquid mixing phase flowing from the compressor 44. The coolant in liquid-phase is discharged from the compressor 44.

The control valve 42 and the compressor 44 are connected to the output port of the controller 50. When the controller 50 determines that the battery 10 is in the discharging or charging state, it executes valve control in which the control valve 42 is opened. When the controller 50 determines that the battery 10 is in the discharging or charging state, it drives a motor of the compressor 44.

1.2 Configuration of Heat Exchange Portion and Cooling Principle

Figure 3:
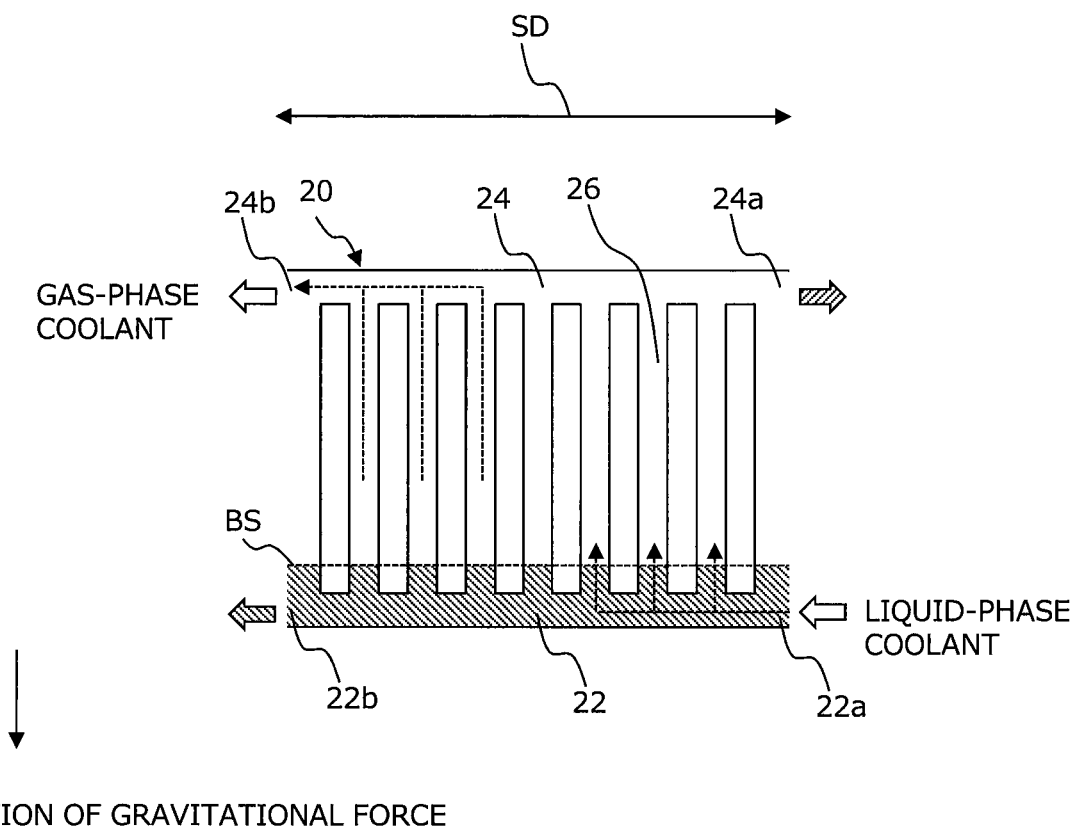
FIG. 3 is a diagram for illustrating a configuration of a heat exchange portion and principles by the heat exchange portion.

FIG. 3 is a diagram for illustrating a configuration of the heat exchange portion 20. As shown in FIG. 3, the heat exchange portion 20 has a first pipe 22 and a second pipe 24. The first pipe 22 and the second pipe 24 extend in a direction parallel to the stacking direction SD. The first pipe 22 is provided below in the direction of the gravitational force. The second pipe 24 is provided above in the direction of the gravitational force. The heat exchange portion 20 further has multiple third pipes 26 connecting the first pipe 22 and the second pipe 24. Each of the third pipes 26 extends vertically.

An upstream end 22a of the first pipe 22 is connected to the coolant pipe 30 or 34 described above. Therefore, the liquid-phase coolant flows into the first pipe 22 from the upstream end 22a. The liquid-phase coolant from the upstream end 22a flows through the first pipe 22 to a downstream end 22b. The downstream end 22b is connected to the coolant pipe 30 or 34 via the return path described above. A portion of the liquid-phase coolant flowing through the first pipe 22 flows into the third pipe 26. A boundary BS between the liquid-phase and the gas-phase is formed in a midstream of the third pipe 26.

The liquid-phase coolant is vaporized by receiving heat from the battery 10 in the discharging or charging state. As a result, the battery 10 is cooled. The vaporized coolant flows through the third pipe 26 and into the second pipe 24. A downstream end 24b of the second pipe 24 is connected to the coolant pipe 32 or 36 described above. An upstream end 24a of the second pipe 24 is connected to the coolant pipe 30 or 34 via the return path described above.

1.3 Valve Control

In the valve control, when it is determined that the battery 10 is in the discharging or charging state, the control valve 42 is fully opened. According to the valve control, the heat exchange portion 20 is continuously supplied with the liquid-phase coolant. Therefore, evaporation of the liquid-phase coolant continuously occurs in the heat exchange portion 20, and the temperature of the battery 10 is maintained at a lower temperature.

(i) Problems

However, as described above, the boundary BS is susceptible to the acceleration or deceleration of the vehicle and is susceptible to the inclination in the road. FIG. 4 to FIG. 9 are diagrams for illustrating these influences.

Figure 4:
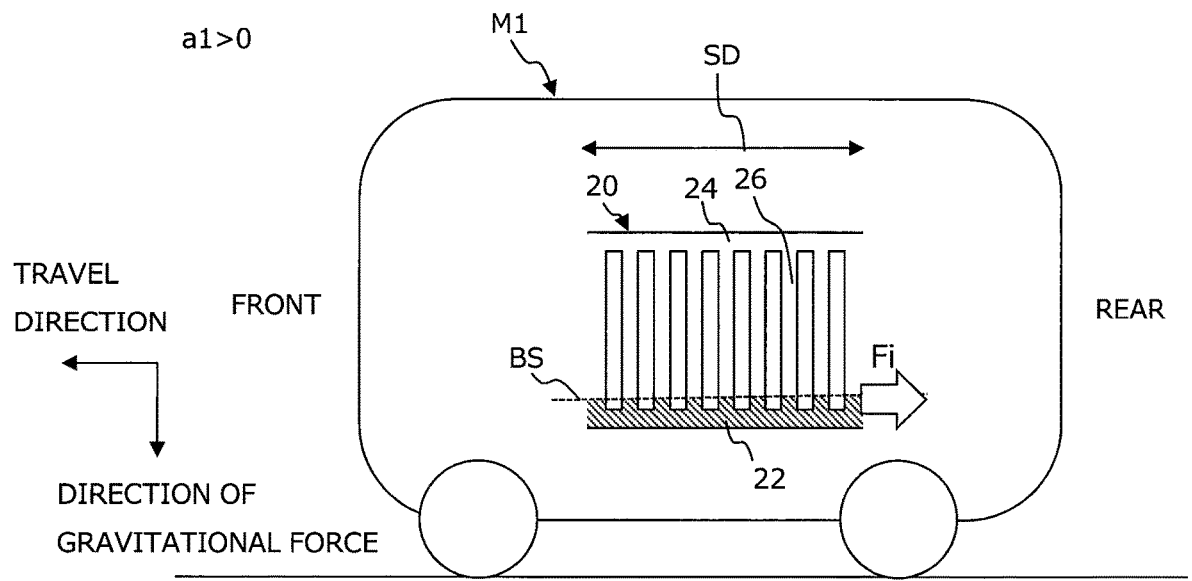
FIG. 4 is a diagram for illustrating an influence during a vehicle acceleration.

FIG. 4 is a diagram for illustrating the influence during a vehicle acceleration. In the example shown in FIG. 4, the stacking direction SD coincides with the longitudinal direction of the vehicle M1. The vehicle M1 is accelerating on a flat road with acceleration a1 (N.B., a1>0). During such the acceleration, an inertial force Fi acts on the vehicle M1. The inertial force Fi acts in an opposite direction of a travel direction of the vehicle M1. The inertial force Fi also acts on the liquid-phase coolant flowing through the first pipe 22. Therefore, the boundary BS inclines so as to be lifted from a front side toward a rear side of the vehicle M1.

Figure 5:
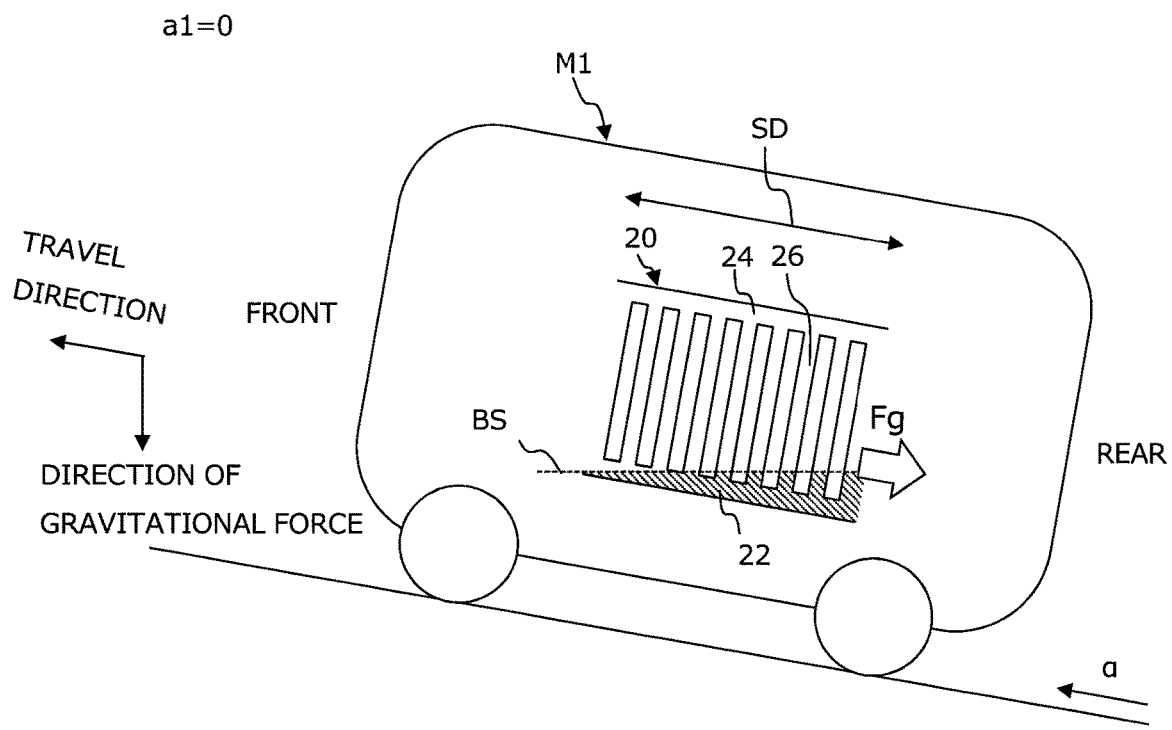
FIG. 5 is a diagram for illustrating the influence during a vehicle travel in an upward slope.

When the boundary BS inclines as just described, the quantity of the liquid-phase coolant to be vaporized on the front side decreases relatively. This problem also occurs when the vehicle M1 is traveling on an upward slope. FIG. 5 is a diagram for illustrating the influence during a vehicle travel in the upward slope. In the example shown in FIG. 5, the vehicle M1 is traveling on the upward slope with a longitudinal slope α (N.B., the acceleration a1=0). During such the travel on the upward slope, component Fg of the gravitational force in the slope direction acts on the vehicle M1. The component Fg also acts on the liquid-phase coolant flowing through the first pipe 22. Therefore, the boundary BS inclines so as to be lifted from the front side toward the rear side.

Figure 6:
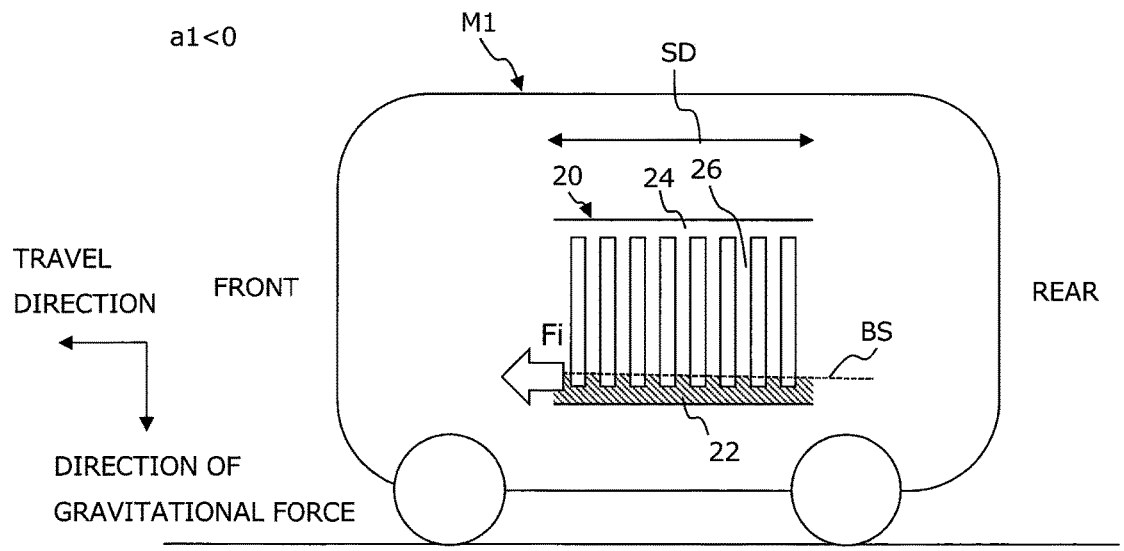
FIG. 6 is a diagram for illustrating the influence during a vehicle deceleration.

FIG. 6 is a diagram for illustrating the influence during a vehicle deceleration. In the example shown in FIG. 6, the vehicle M1 is decelerating on the flat road (N.B., the acceleration a1<0). During such the deceleration, the inertial force Fi acts on the vehicle M1. The inertial force Fi acts in the same direction as the travel direction. The inertial force Fi also acts on the liquid-phase coolant flowing through the first pipe 22. Therefore, the boundary BS inclines so as to be lifted from the rear side toward the front side.

Figure 7:
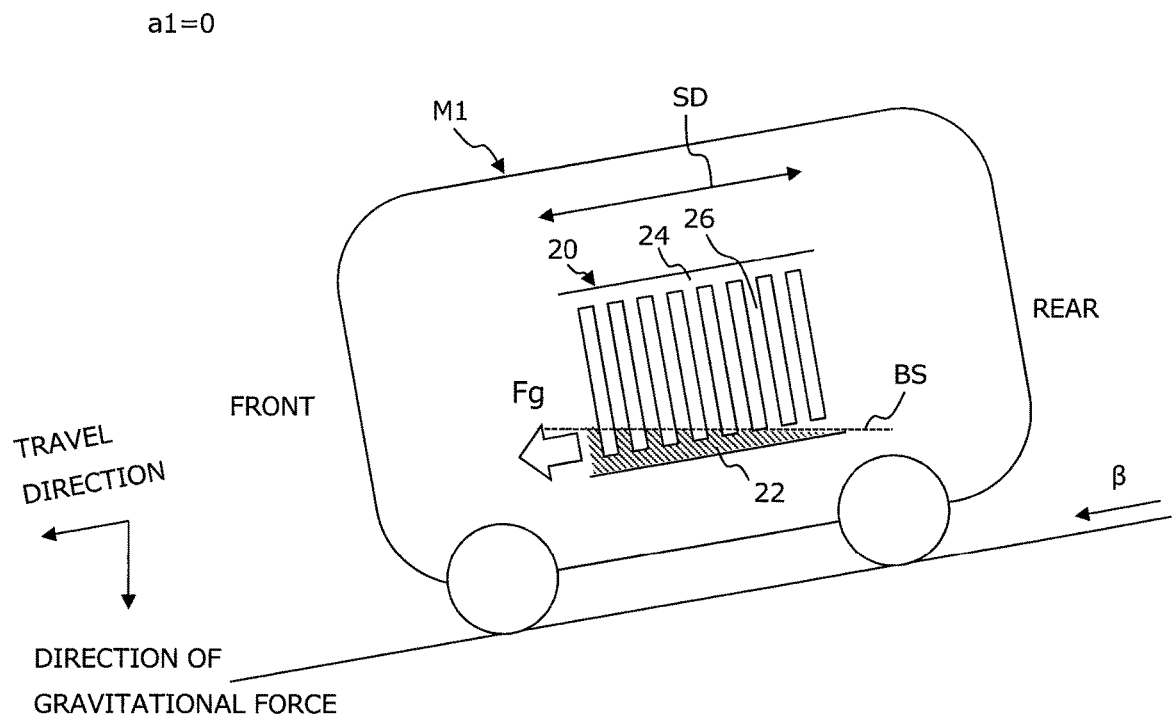
FIG. 7 is a diagram for illustrating the influence during the vehicle travel in a downward slope.

When the boundary BS inclines as just described, the quantity of the liquid-phase coolant to be vaporized on the rear side decreases relatively. This problem also occurs when the vehicle M1 travels on a downward slope. FIG. 7 is a diagram for illustrating the influence during the vehicle travel in the downward slope. In the example shown in FIG. 7, the vehicle M1 is traveling on the downward slope having a longitudinal slope β (N.B., the acceleration a1=0). During such the travel on the downward slope, the component Fg of the gravitational force in the slope direction acts on the vehicle M1. The component Fg also acts on the liquid-phase coolant flowing through the first pipe 22. Therefore, the boundary BS inclines so as to be lifted from the rear side toward the front side.

Figure 8:
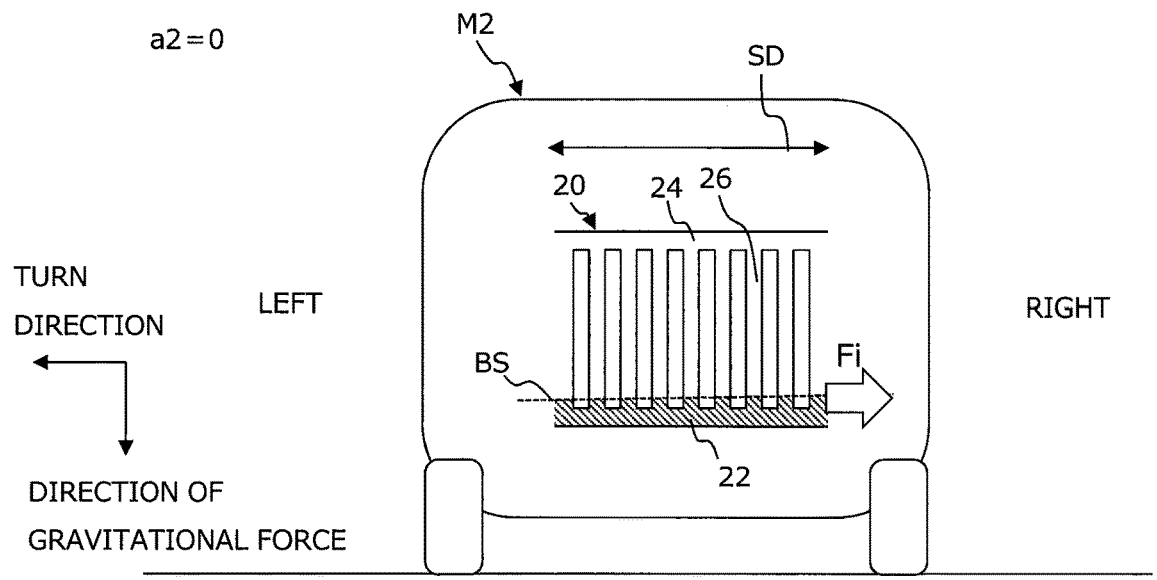
FIG. 8 is a diagram for illustrating the influence during a vehicle turning.

FIG. 8 is a diagram for illustrating the influence during a vehicle turning. In the example shown in FIG. 8, the stacking direction SD coincides with the horizontal direction of the vehicle M2. The vehicle M2 turns in a leftward direction (N.B., acceleration a2=0). During such the vehicle turning, the inertial force (i.e., centrifugal force) Fi acts on the vehicle M2. The inertial force acts in the opposite direction to the turn direction. The inertial force Fi also acts on the liquid-phase coolant flowing through the first pipe 22. Therefore, the boundary BS inclines so as to be lifted from a left side toward a right side of the vehicle M2.

Figure 9:
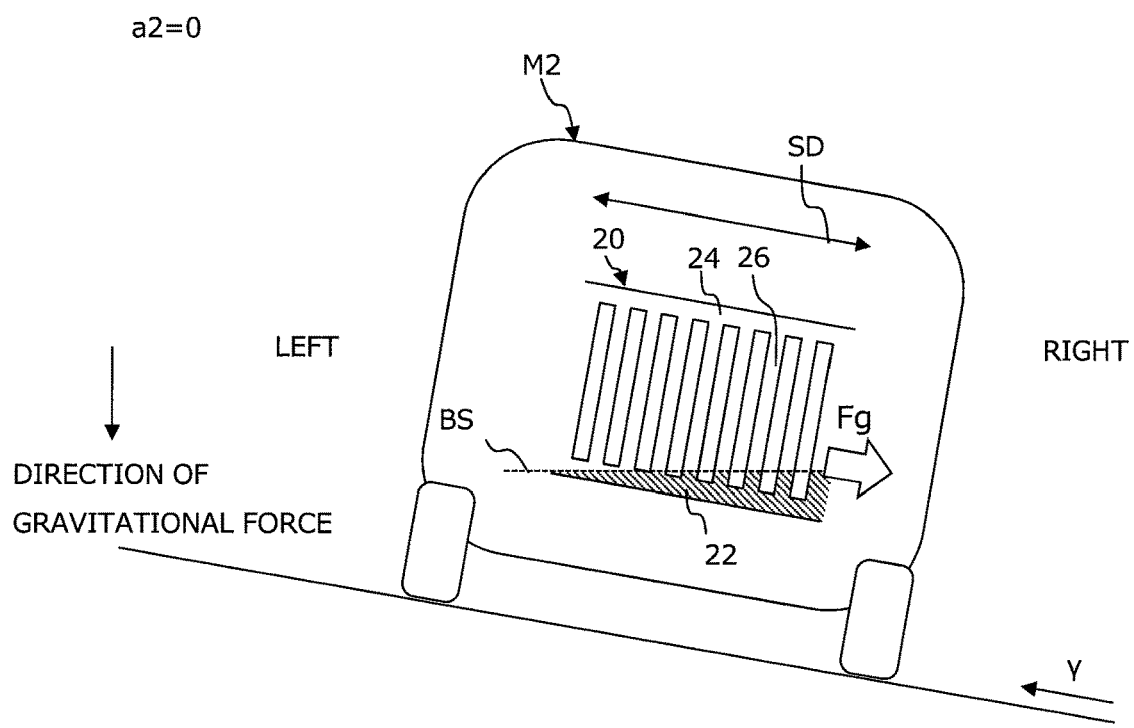
FIG. 9 is a diagram for illustrating the influence during the vehicle travel in a road having a transverse slope.

When the boundary BS inclines as just described, the amount of the liquid-phase coolant to be vaporized decreases in a left side of the vehicle M2. This problem also occurs when the vehicle M2 travels on a road having a transverse slope. FIG. 9 is a diagram for illustrating the influence during the vehicle travel in the road having the transverse slope. In the example shown in FIG. 9, the vehicle M2 is traveling on a straight load having a transverse slope γ (N.B., the acceleration a2=0). During such the travel as just described, the component Fg of the gravitational force in the slope direction acts on the vehicle M2. The component Fg also acts on the liquid-phase coolant flowing through the first pipe 22. Therefore, the boundary BS inclines so as to be lifted from the left side to the right side (ii) Valve Control Processing The problems described above are due to the force acting in the stacking direction SD on the liquid-phase coolant flowing through the first pipe 22. When the force in the stacking direction SD continues to act, a variation in temperature occurs between the cells, which leads to partial degradation of the cells. Therefore, in the valve control of the first embodiment, the control valve 42 is controlled based on values detected by the inertial sensor 52 and the inclination sensor 54.

(iii) First Processing Example

Figure 10:
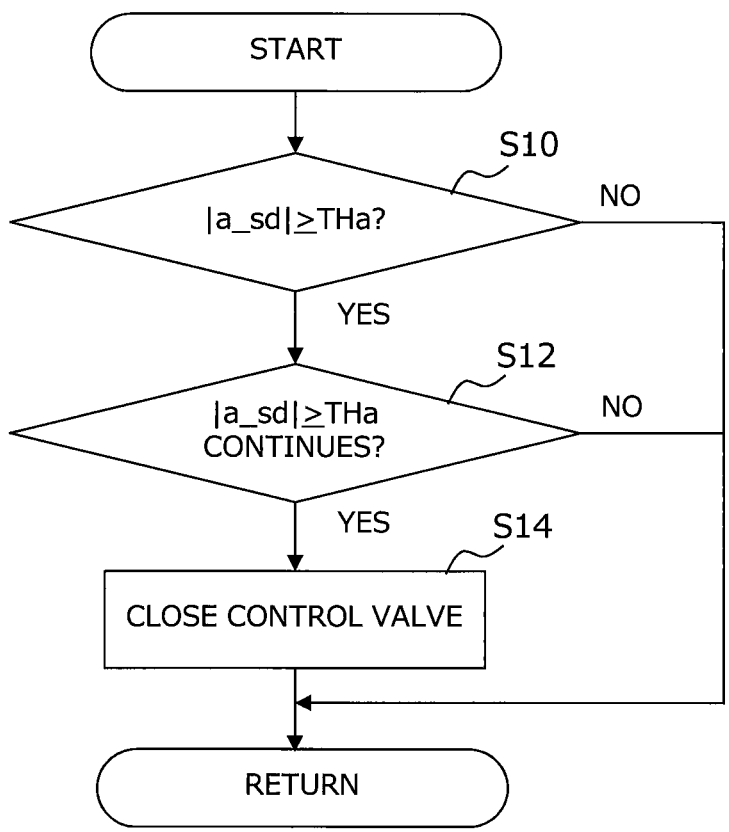
FIG. 10 is a flow chart for illustrating a valve control processing flow executed based on values detected by an inertial sensor in the first embodiment.

FIG. 10 is a flow chart for illustrating the valve control processing flow executed based on the detected values of the inertial sensor 52. The routine shown in FIG. 10 is repeatedly executed at a predetermined control cycle when the battery 10 is in the discharging or charging state.

In the routine shown in FIG. 10, first, it is determined whether or not absolute value |a_sd| of the acceleration in the stacking direction SD is equal to or greater than a threshold THa (step S10). If the determination result in the step S10 is negative, the valve control processing is terminated.

If the determination result in the step S10 is positive, it is determined whether or not a condition in which the absolute value |a_sd| is equal to or greater than the threshold THa continues (step S12). In the process of step S12, the determination processing of step S10 is repeatedly executed over the determination period JT1. If the determination result of the step S12 is negative, it can be determined that the influence on the boundary BS is within an allowable range even though the inertial force acts in the stacking direction SD. Therefore, the valve control processing is terminated.

If the determination result in the step S12 is positive, the control valve 42 is closed (step S14). When the control valve 42 is closed, supply of new liquid-phase coolant to the first pipe 22 is stopped.

(iv) Second Processing Example

Figure 11:
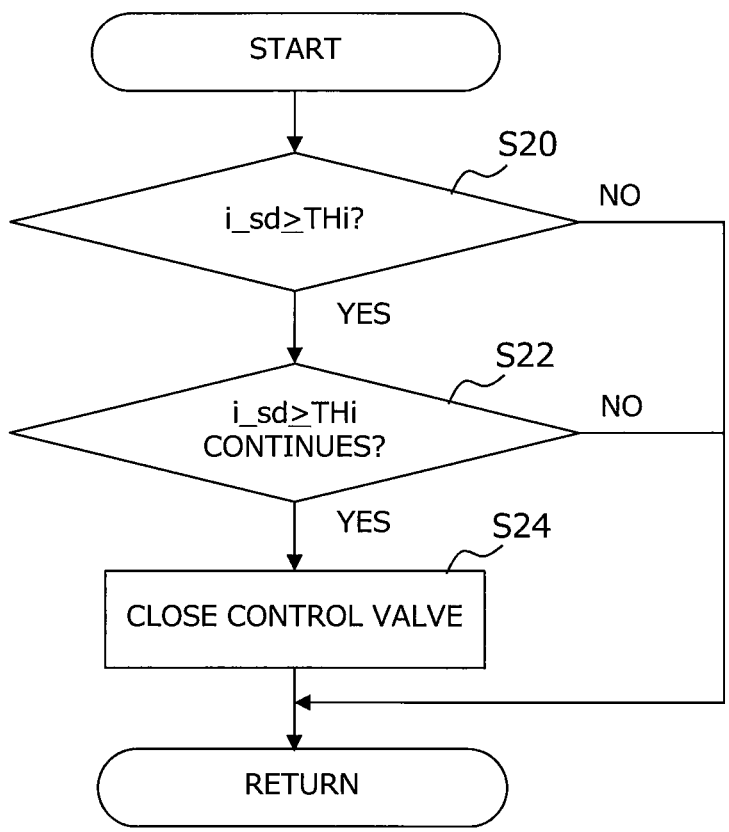
FIG. 11 is a flow chart for illustrating the valve control processing flow executed based on inclination sensor detected values.

FIG. 11 is a flow chart for illustrating a valve control processing flow executed based on the detected values of the inclination sensor 54. The routine shown in FIG. 11 is repeatedly executed at the predetermined cycle when the battery 10 is in the discharging or charging state.

In the routine shown in FIG. 11, it is first determined whether or not a gradient i_sd in the stacking direction SD is equal to or greater than a threshold THi (step S20). The gradient i_sd is the longitudinal slope or the transverse slope described above. If the determination result in the step S20 is negative, the valve control processing is terminated.

If the determination result in the step S20 is positive, it is determined whether or not a condition in which the gradient i_sd is equal to or greater than the threshold THi continues (step S22). In the processing of the step S22, the determination processing of the step S20 is repeatedly executed over a determination period JT2. If the determination result of the step S22 is negative, it can be determined that the influence on the boundary BS is within the allowable range even though the gravitational component acts in the stacking direction SD. Therefore, the valve control processing is terminated.

If the determination result in the step S22 is positive, the control valve 42 is closed (step S24). The processing executed in the step S24 is the same as that executed in the step S14 shown in FIG. 10.

1.4 Advantageous Effect

According to the valve control processing executed in the first embodiment, the control valve 42 is closed when it is determined that the influences on the boundary BS are out of the allowable range. Therefore, it is possible to prevent the variation in temperature between the cells from occurring.

1.5 Correspondence Between First Embodiment and Aspects

In the first embodiment, the chiller 40 or a combination of the compressor 44 and the condenser 46 corresponds to the "first heat exchanger" in the first aspect. The heat exchange portion 20 corresponds to the "second heat exchanger" in first aspect. The first pipe 22 corresponds to the "common pipe for the cells" in first aspect. The state in which the absolute value |a_sd| is equal to or greater than the threshold THa or the state in which the gradient i_sd is equal to or greater than the threshold THi corresponds to the "first state" in the first aspect.

2. SECOND EMBODIMENT

Next, a second embodiment of the present disclosure will be described with reference to FIG. 12 to FIG. 14. Note that descriptions overlapping with those in the first embodiment are omitted as appropriate.

2.1 Configuration of Cooling System (i) First Configuration Example

Figure 12:
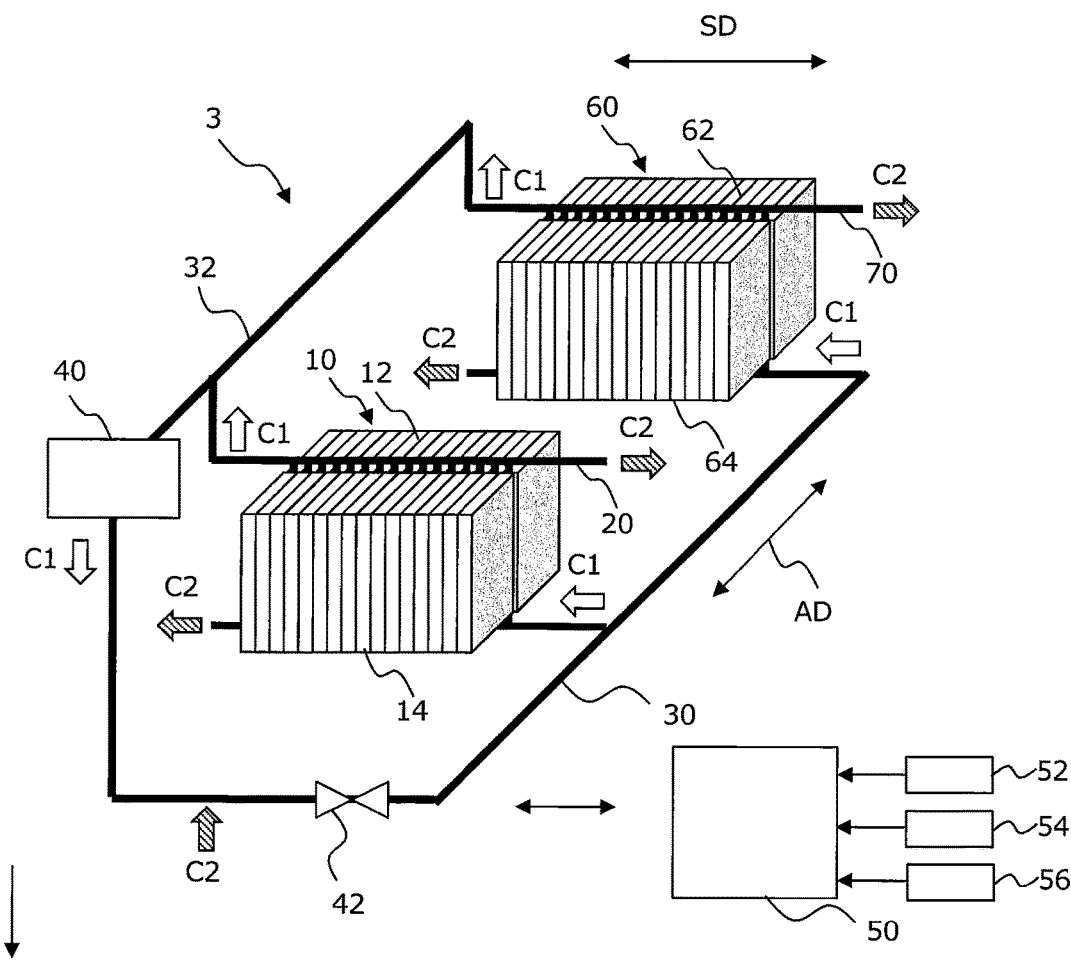
FIG. 12 is a diagram for illustrating a first configuration example of the cooling system according to a second embodiment.

FIG. 12 is a diagram for illustrating a first configuration example of the cooling system according to the second embodiment. A cooling system 3 shown in FIG. 12 includes the battery 10 and a battery 60, the heat exchange portion 20 and a heat exchange portion 70, the coolant pipes 30 and 32, the chiller 40, the control valve 42 and the controller 50. In other words, the configuration of the cooling system 3 includes the battery 60 and the heat exchange portion 70 in addition to that of the cooling system 1 described with reference to FIG. 1

The battery 60 has a third stack 62 and a fourth stack 64. The battery 60 configuration is the same as the battery 10 configuration. The array direction AD of the batteries 10 and 60 is perpendicular to the stacking direction SD.

The heat exchange portion 70 is provided between the third stack 62 and the fourth stack 64. The configuration of the heat exchange portion 70 is the same as that of the heat exchange portion 20.

The current sensor 56 detects the charging current and the discharging current of the battery 10 (or the battery 60). The controller 50 determines each states of the batteries 10 and 60 based on values detected by the current sensor 56. When the controller 50 determines that the battery 10 or 60 is in the discharging or charging state, it executes valve control in which the control valve 42 is opened.

(ii) Second Configuration Example

Figure 13:
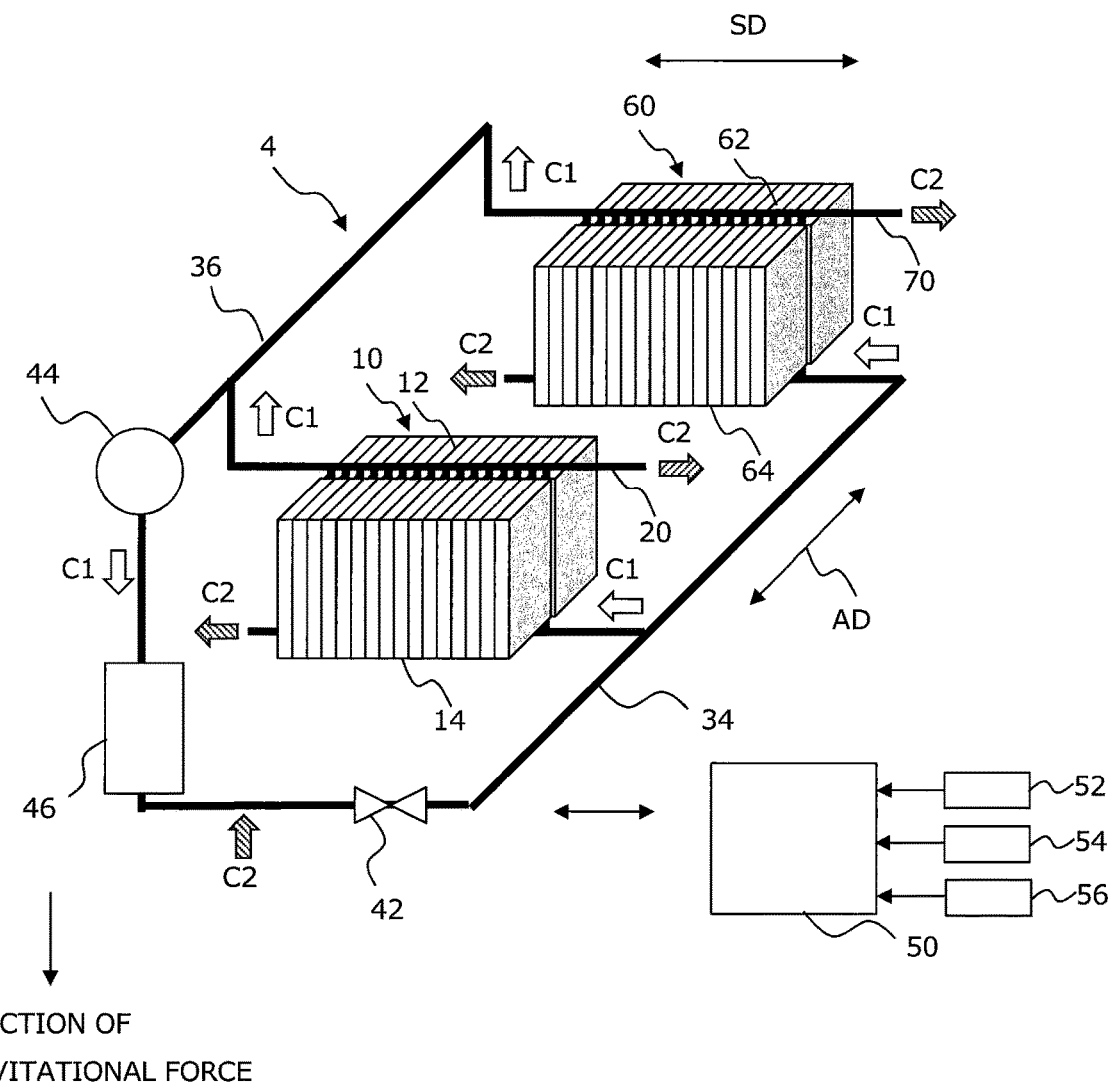
FIG. 13 is a diagram for illustrating a second configuration example of the cooling system according to the second embodiment.

FIG. 13 is a diagram for illustrating a second configuration example of the cooling system according to the second embodiment. A cooling system 4 shown in FIG. 13 includes the batteries 10 and 60, the heat exchange portions 20 and 70, the coolant pipes 34 and 36, the control valve 42, the compressor 44, the condenser 46 and the controller 50. In other words, the configuration of the cooling system 4 includes the battery 60 and the heat exchange portion 70 in addition to that of the cooling system 2 described with reference to FIG. 2.

The current sensor 56 detects the charging current and the discharging current of the battery 10 (or battery 60). The controller 50 determines each status of the batteries 10 and 60 based on values detected by the current sensor 56. When the controller 50 determines that the battery 10 or 60 is in the discharging or charging state, it executes valve control in which the control valve 42 is opened. When the controller 50 determines that the battery 10 or 60 is in the discharging or charging state, it drives the motor of the compressor 44.

2.3 Valve Control

(i) Problems

If the batteries 10 and 60 are provided in parallel, the problems due to the inclination of the boundary BS described above also occur in the array direction AD. In other words, if the force in the array direction AD continues to act on the liquid-phase coolant that flows through the first pipe 22, a variation in temperature between batteries, which leads to a problem that one of the batteries deteriorates.

(ii) Valve Control Processing

Therefore, in the valve control of the second embodiment, the valve control of the first embodiment is applied to the array direction AD. FIG. 14 is a flow chart for illustrating the valve control processing flow executed based on the detected values of the inertial sensor 52. The routine shown in FIG. 14 is repeatedly executed at the predetermined control cycle when the batteries 10 and 60 are in the discharging or charging state.

Figure 14:
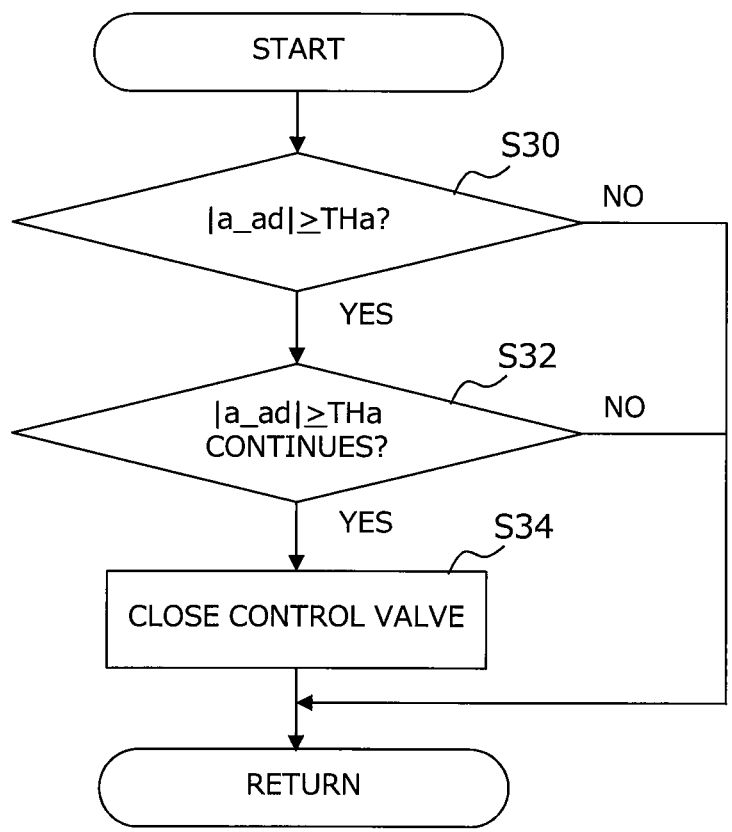
FIG. 14 is a flow chart for illustrating the valve control processing flow executed based on values detected by the inertial sensor in the second embodiment.

In the routine shown in FIG. 14, first, it is determined whether or not the absolute value |a_ad| of the acceleration in the array direction AD is equal to or greater than the threshold THa (step S30). If the determination result in the step S30 is negative, the valve control processing is terminated.

If the determination result in the step S30 is positive, it is determined whether or not the state in which the absolute value |a_ad| is equal to or greater than the threshold THa continues (step S32). In the processing of the step S32, the determination processing of the step S30 is repeatedly executed over the determination period JT1. If the determination result of the step S32 is negative, it can be determined that the influences on the boundary BS is within the acceptable range even though the inertial force acts in the array direction AD. Therefore, the valve control processing is terminated.

If the determination result in the step S32 is positive, the control valve 42 is closed (step S34). The processing executed in the step S34 is the same as that executed in the step S14 shown in FIG. 10.

The valve control processing flow executed based on the detected values of the inclination sensor 54 is basically the same as that described in FIG. 12. That is, the valve control processing flow executed based on the detected values of the inclination sensor 54 will be described if the gradients i_sd of the steps S20 and S22 in FIG. 12 are replaced with the gradients i_ad in the array direction AD. The gradients i_ad are the longitudinal slope or the transverse slope described above.

2.4 Advantageous Effect

According to the valve control processing executed in the second embodiment, it is possible to prevent the variation in temperature between the batteries from occurring in the system in which the batteries 10 and 60 are provided in parallel.

2.5 Correspondence Between Second Embodiment and Aspect

The state in which the absolute value |a_ad| is equal to or greater than the threshold THa or the state in which the gradient i_ad is equal to or greater than the threshold THi corresponds to the "second state" in the fourth aspect.

3. THIRD EMBODIMENT

Next, a third embodiment of the present disclosure will be described with reference to FIG. 15 and FIG. 16. Note that descriptions overlapping with those of the first embodiment are omitted as appropriate.

3.1 Configuration of Cooling System

(i) First Configuration Example

Figure 15:
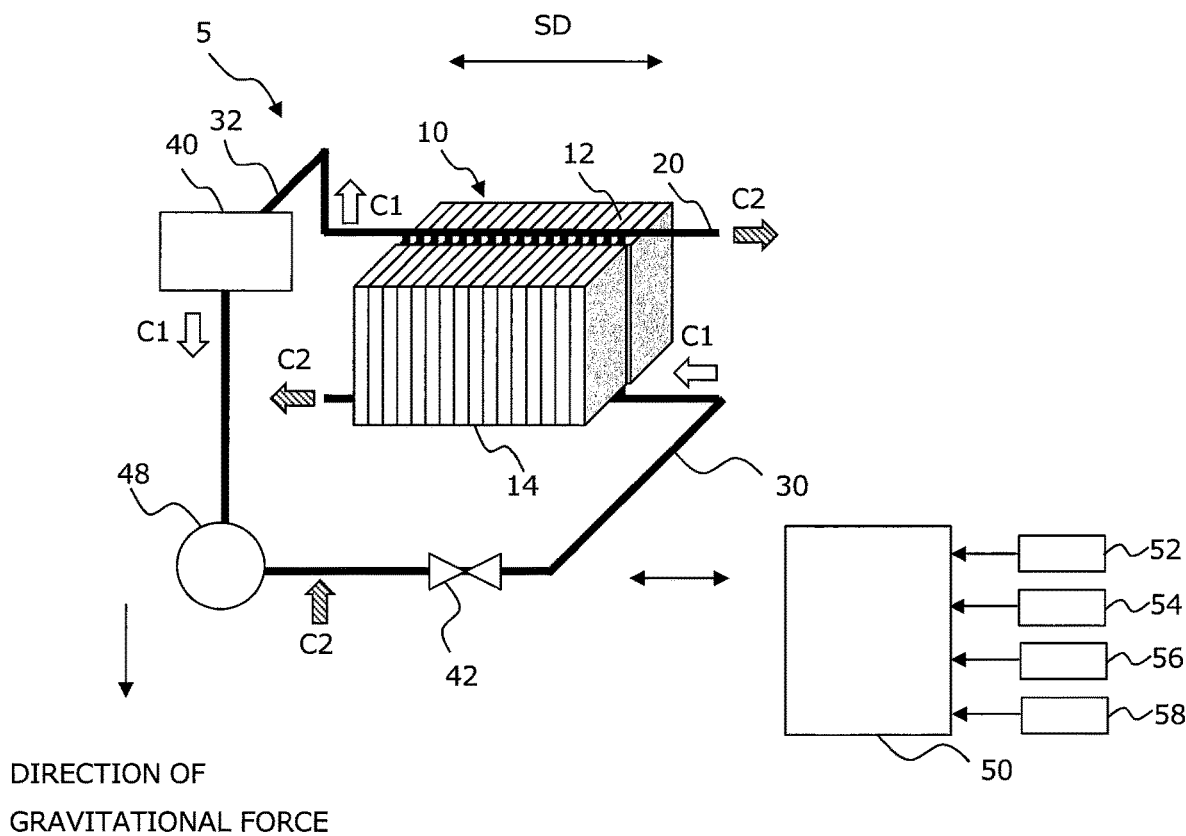
FIG. 15 is a diagram for illustrating a first configuration example of the cooling system according to a third embodiment.

FIG. 15 is a diagram for illustrating a first configuration example of the cooling system according to the third embodiment. A cooling system 5 shown in FIG. 15 includes the battery 10, the heat exchange portion 20, the coolant pipes 30 and 32, the chiller 40, the control valve 42, a pump 48, and the controller 50. In other words, the configuration of the cooling system 5 includes the pump 48 in addition to that of the cooling system 1 described with reference to FIG. 1. The pump 48 pumps the coolant flowing into the pump 48.

The inertial sensor 52, the inclination sensor 54, the current sensor 56 and temperature sensors 58 are connected to the input port of the controller 50. In other words, the configuration of the cooling system 5 includes the temperature sensors 58 in addition to that of the cooling system 1 described with reference to FIG. 1. Each of the temperature sensors 58 detects each temperature of the cells. The temperature sensors 58 are arranged at least two spots in the stacking direction SD. The control valve 42 and the pumps 48 are connected to the output port of the controller 50.

(ii) Second Configuration Example

A second configuration example of the cooling system according to the third embodiment includes the pump 48 and the temperature sensors 58 in addition to that of the cooling system 2 described with reference to FIG. 2. The arrangement spots of the pumps 48 and the temperature sensors 58 are the same as those in the first configuration example described with reference to FIG. 15.

3.2 Cooling Control

In the third embodiment, drive control of the pumps 48 is executed in addition to the valve control described in the first embodiment. FIG. 16 is a flow chart for illustrating a cooling control processing flow executed in the third embodiment. The routine shown in FIG. 16 is repeatedly executed at the predetermined control cycle when the batteries 10 and 60 are in the discharging or charging state.

Figure 16:
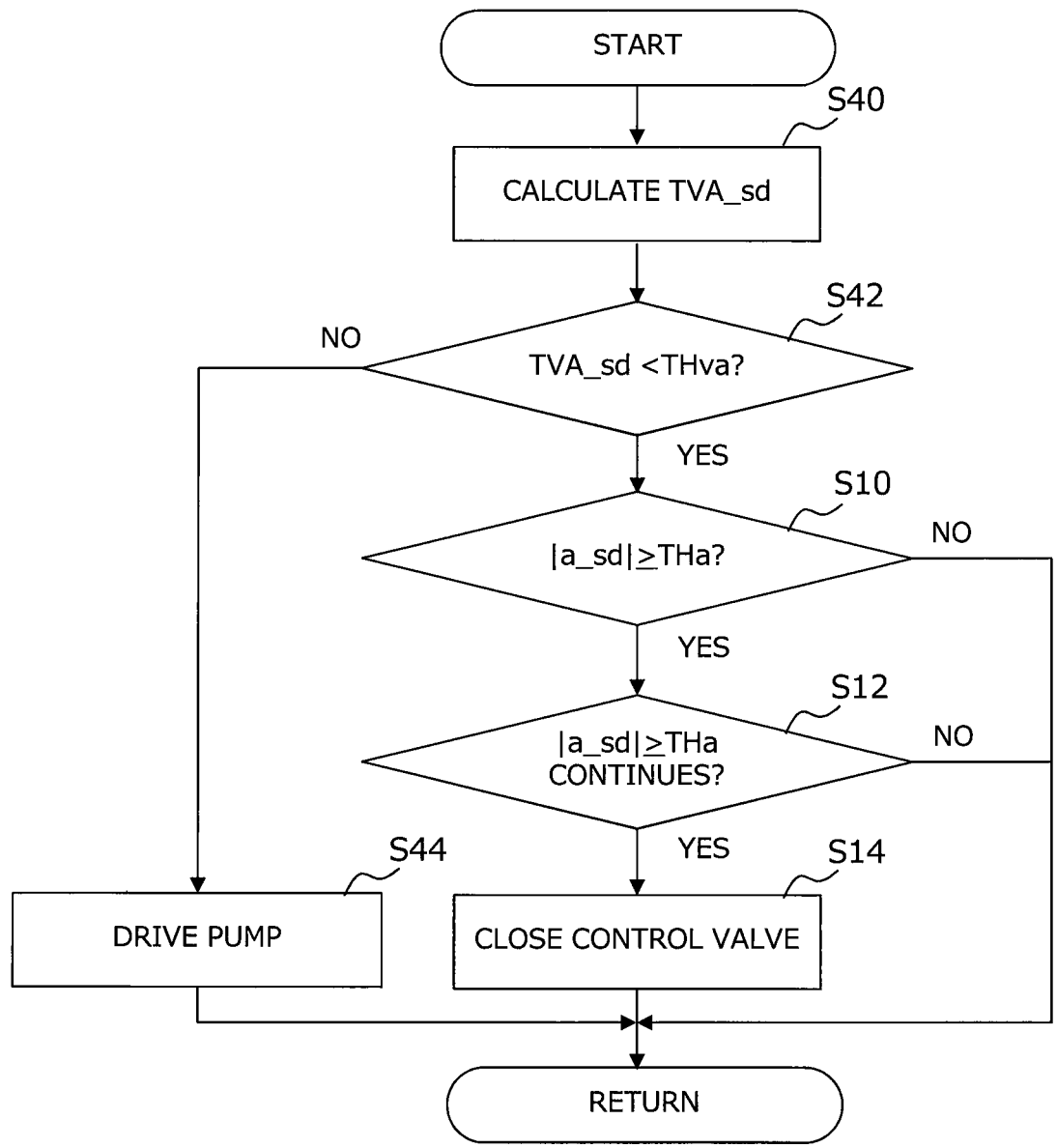
FIG. 16 is a flow chart for illustrating a cooling control processing flow executed in the third embodiment.

In the routine shown in FIG. 16, first, a variation in temperature TVA_sd is calculated (step S40). The variation in temperature TVA_sd is the variation in temperature between the cells in the stacking direction SD. The variation in temperature TVA_sd is calculated based on the detected values of the temperature sensor 58.

Subsequent to the step S40, it is determined whether the variation in temperature TVA_sd is less than a threshold THva (step S42). When the determination result of the step S42 is positive, the processing of the steps S10 to S14 are executed. The processing executed in the steps S10 to S14 is described with reference to FIG. 10. Instead of the processing from the steps S10 to S14, the processing from the steps S20 to S24 described with reference to FIG. 11 may be executed.

If the determination result in the step S42 is negative, the pump 48 is driven (step S44). When the pump 48 is driven, the amount of the liquid-phase coolant flowing through the coolant pipe 30 is increased. When the amount of liquid-phase coolant is increased, the amount of the coolant flowing into the heat exchange portion 20 is also increased. Then, speed of the heat-exchange in the heat exchange portion 20 increases thereby the entire battery 10 is cooled.

The temperature of the battery 10 cooled by the evaporation of the coolant converges to a constant lower temperature. Therefore, when the entire battery 10 is cooled, the variation in temperature TVA_sd is reduced.

3.3 Advantageous Effect

According to the third embodiment, when the variation in temperature TVA_sd is equal to or larger than the threshold THva, the amount of the coolant flowing into the heat exchange portion 20 is increased. Therefore, even if the variation in temperature TVA_sd occurs despite the execution of the valve control of the first embodiment, it is possible to reduce the variation in temperature TVA_sd.

3.4 Correspondence Between Third Embodiment and Aspect

In the third embodiment, the variation in temperature TVA_sd corresponds to the "first variation in temperature" in the third aspect. The threshold THva corresponds to the "first determination value" in third aspect.

4. FOURTH EMBODIMENT

Next, a fourth embodiment of the present disclosure will be described with reference to FIG. 17. Note that descriptions overlapping with those of the first to third embodiments are omitted as appropriate.

4.1 Configuration of Cooling System

(i) First Configuration Example

Figure 17:
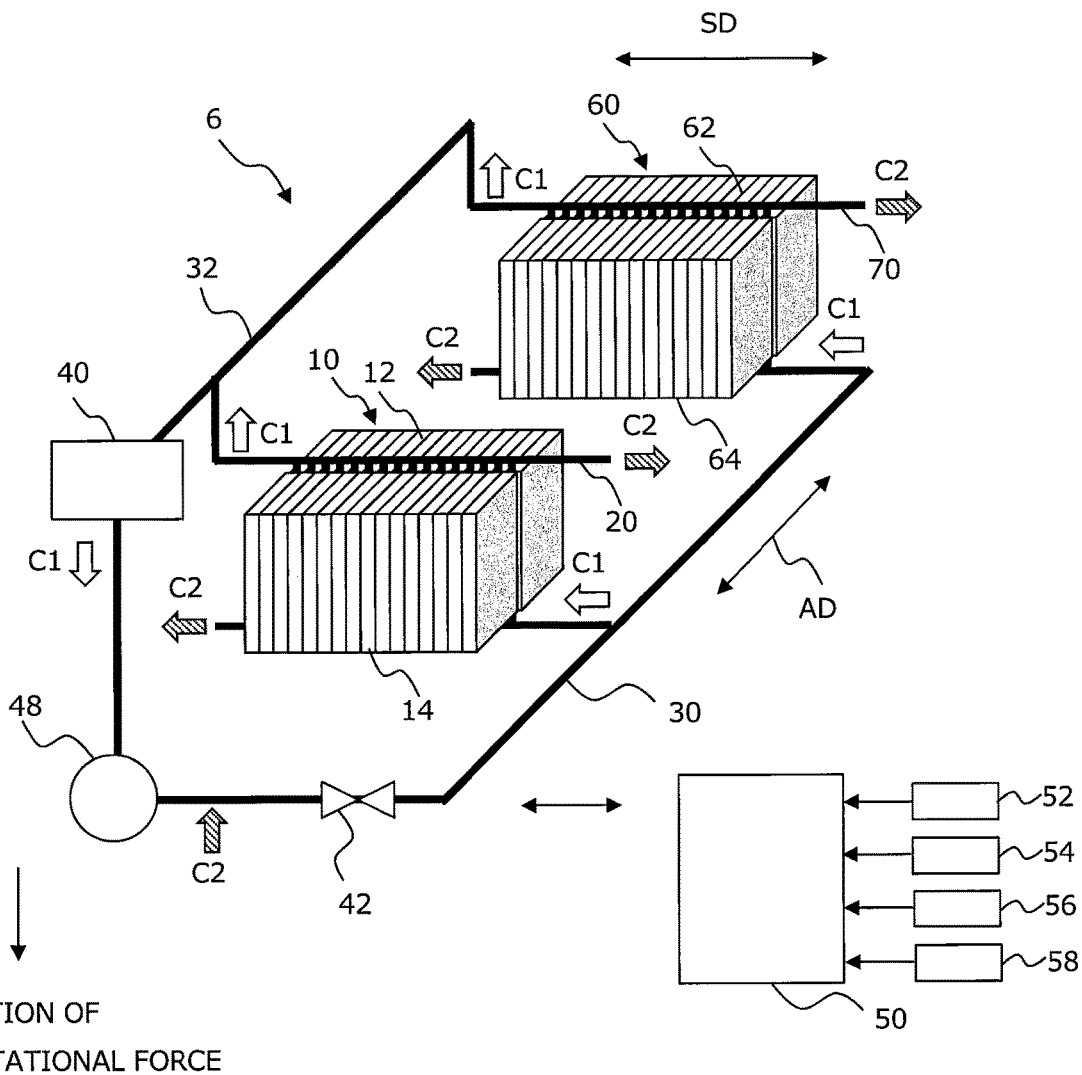
FIG. 17 is a diagram for illustrating a first configuration example of the cooling system according to a fourth embodiment.

FIG. 17 is a diagram for illustrating a first configuration example of the cooling system according to the fourth embodiment. A cooling system 6 shown in FIG. 17 includes the batteries 10 and 60, the heat exchange portions 20 and 70, the coolant pipes 30 and 32, the chiller 40, the control valve 42, the pump 48, and the controller 50. That is, the configuration of the cooling system 6 includes the pump 48 in addition to that of the cooling system 3 described with reference to FIG. 12.

The inertial sensor 52, the inclination sensor 54, the current sensor 56 and the temperature sensors 58 are connected to the input port of the controller 50. That is, the configuration of the cooling system 6 includes the temperature sensors 58 in addition to that of the cooling system 3 described with reference to FIG. 12. The temperature sensors 58 detects temperatures of the batteries 10 and 60. For example, the temperature sensors 58 are arranged at three spots in each stacking direction SD. The control valve and the pump 48 are connected to the output port of the controller 50.

(ii) Second Configuration Example

A second configuration example of the cooling system according to the fourth embodiment includes the pump 48 and the temperature sensors 58 in addition to that of the cooling system 4 with reference to FIG. 13. The arrangement spots of the pumps 48 and the temperature sensors 58 are the same as those in the first configuration example described with reference to FIG. 17.

4.2 Cooling Control

In the fourth embodiment, the same cooling control as the third embodiment is executed. The cooling control processing flow will be described with reference to FIG. 16. That is, the cooling control processing flow will be described if the variations in temperature TVA_sd of the steps S40 and S42 in FIG. 16 are replaced with the variations in temperature TVA_ad. The variation in temperature TVA_ad is the variation in temperature between batteries in the array direction AD.

4.3 Advantageous Effect

According to the fourth embodiment, when the variation in temperature TVA_ad is equal to or larger than the threshold THva, the amount of the coolant flowing into the heat exchange portion 20 is increased. Therefore, even if the variation in temperature TVA_ad occurs despite the execution of the valve control of the second embodiment, it is possible to reduce the variation in temperature TVA_ad.

4.4 Correspondence Between Fourth Embodiment and Aspect

In the above fourth embodiment, the variation in temperature TVA_ad corresponds to the "second variation in temperature" in the sixth aspect. Threshold THva corresponds to the "second determination value" in the sixth aspect.

5. OTHER EMBODIMENTS

In the first and second embodiments, the control valve 42 was closed if it was determined that the influences on the boundary BS was out of the allowable range. However, instead of closing the control valve 42, the opening degree of the control valve 42 may be reduced. When the opening degree of the control valve 42 is reduced, the amount of the coolant flowing into the heat exchange portion 20 is reduced.

Therefore, it is possible to prevent the variation in temperature between the cells from occurring.

In the first embodiment, if the determination results of the steps S10 and S12 in FIG. 10 are positive, the control valve 42 was closed. Alternatively, if the determination results of the steps S20 and S22 in FIG. 11 are positive, the control valve 42 was closed. In the second embodiment, if the determination results of the steps S30 and S32 in FIG. 14 are positive, the control valve 42 was closed. However, the control valve 42 may be closed if only the determination result of the steps S10, S20 or S30 is positive. In other words, the execution of the processing in the step S12, S22, or S32 may be omitted.

In the first to fourth embodiments, the gradient of the road is obtained based on the detected values of the inclination sensor 54. However, if map information and information on actual location are available to the controller 50, the gradient may be obtained based on the information. The map information is obtained, for example, from a map database of a car navigation system. The information on the actual location is obtained, for example, from a GPS (Global Positioning System) receiver.

What is claimed is:

1. A cooling system for on-board battery, comprising:
a battery which is mounted on a vehicle;
a circuit in which a coolant circulates to change between liquid-phase and gas-phase by exchanging heat with the battery;
a first heat exchanger which is provided in midstream of the circuit and is configured to change the coolant from the gas-phase to the liquid-phase;
a second heat exchanger which is provided downstream of the first heat exchanger and is configured to exchange heat with the battery using liquid-phase coolant flowing from the first heat exchanger;
a control valve which is provided between the first and second heat exchangers and is configured to control flow volume of the liquid-phase coolant flowing from the first heat exchanger into the second heat exchanger;
an acquiring device which is configured to acquire a parameter having a correlation with force acting on the vehicle; and
a controller which is programmed to adjust an opening degree of the control valve, wherein:
the battery includes a stack of cells;
the second heat exchanger includes a common pipe for the cells that extends in a direction parallel to a stacking direction of the cells and is commonly provided in the cell; and
the controller is further programmed to:
estimate, based on the parameter, magnitude of the force acting in the stacking direction on the liquid-phase coolant flowing through the common pipe for the cells; and
if the magnitude of the force acting in the stacking direction is greater than or equal to a first preset value, adjust the opening degree to reduce the flow volume.

2. The cooling system according to claim 1,
wherein the controller is further programmed to:
determine whether or not a first state in which the magnitude of the force acting in the stacking direction is equal to or greater than the first preset value continues over a first determination period; and
if it is determined that the first state continues over the first determination period, adjust the opening degree to reduce the flow volume.

3. The cooling system according to claim 2,
wherein the controller is further programmed to adjust the opening degree so that the flow volume is null if it is determined that the first state continues over the first determination period.

4. The cooling system according to claim 1, further comprising multiple temperature sensors, each of which is configured to detect each temperature of at least two cells included in the battery,
wherein the controller is further programmed to:
calculate, based on the temperatures of the at least two cells, a first variation in temperature between the at least two cells;
determine whether or not the first variation in temperature is greater than or equal to a first determination value; and
if it is determined that the first variation in temperature is equal to or greater than the first determination value, adjust the opening degree to increase the flow volume.

5. The cooling system according to claim 1, wherein:
the battery is composed of multiple batteries provided in parallel;
the circuit includes a common pipe for the multiple batteries that extends in an array direction of the multiple batteries and is commonly provided in the multiple batteries; and
the controller is further programmed to:
estimate, based on the parameter, the magnitude of the force acting in the array direction on the liquid-phase coolant flowing through the common pipe for the multiple batteries; and
if the magnitude of the force acting in the array direction is greater than or equal to a second preset value, adjust the opening degree to reduce the flow volume.

6. The cooling system according to claim 5,
wherein the controller is further programmed to:
determine whether or not a second state in which the magnitude of the force acting in the array direction is equal to or greater than the second preset value continues over a second determination period; and
if it is determined that the second state continues over the second determination period, adjust the opening degree to reduce the flow volume.

7. The cooling system according to claim 6,
wherein the controller is further programmed to adjust the opening degree so that the flow volume is null if it determined that second state continues over the second determination period.

8. The cooling system according to claim 5, further comprising multiple temperature sensors, each of which is configured to detect each temperature of the multiple batteries,
wherein the controller is further programmed to:
calculate, based on the each temperature, a second variation in temperature between the multiple batteries;
determine whether or not the second variation in temperature is greater than or equal to a second determination value; and
if it is determined that the second variation in temperature is equal to or greater than the second determination value, adjust the opening degree to increase the flow volume.

* * * * *